(12) United States Patent
Moon et al.

(10) Patent No.: US 11,781,888 B2
(45) Date of Patent: Oct. 10, 2023

(54) REFLECTED LIGHT WAVELENGTH SCANNING DEVICE INCLUDING SILICON PHOTONICS INTERROGATOR

(71) Applicants: PHOTONICS PLANAR INTEGRATION TECHNOLOGY INC, Gwangju (KR); DAEGU GYEONGBUK INSTITUTE OF SCIENCE AND TECHNOLOGY, Daegu (KR)

(72) Inventors: Hyung Myung Moon, Gwangju (KR); Seung Chan Kwak, Gwangju (KR); Jin Bong Kim, Gwangju (KR); Sangyoon Han, Daegu (KR)

(*) Notice: Subject to any disclaimer, the term of this patent is extended or adjusted under 35 U.S.C. 154(b) by 1 day.

(21) Appl. No.: 17/540,668

(22) Filed: Dec. 2, 2021

(65) Prior Publication Data
US 2022/0276076 A1 Sep. 1, 2022

(30) Foreign Application Priority Data

Feb. 26, 2021 (KR) .................. 10-2021-0026823

(51) Int. Cl.
*G01D 5/353* (2006.01)
*G01N 21/39* (2006.01)
*G02B 6/30* (2006.01)
*G02B 6/02* (2006.01)

(52) U.S. Cl.
CPC ......... *G01D 5/35303* (2013.01); *G01N 21/39* (2013.01); *G02B 6/305* (2013.01); *G02B 6/02085* (2013.01)

(58) Field of Classification Search
CPC ........... G01D 5/35303; G01D 5/35316; G01D 5/35367; G01N 21/39; G02B 6/305; G02B 6/02085; G02B 5/201; G02B 6/293; G01K 11/3206; G01L 1/246; G01J 1/0425; G01J 1/0429; G01J 1/0437; G01J 1/0455

See application file for complete search history.

(56) References Cited

U.S. PATENT DOCUMENTS 11,199,393 B2 * 12/2021 Moore .................. G01L 1/246

FOREIGN PATENT DOCUMENTS

| KR | 10-0807440 | 2/2008 |
| KR | 10-2011-0112086 | 10/2011 |
| KR | 10-1424601 | 8/2014 |
| KR | 10-2015-0146468 | 12/2015 |

(Continued)

OTHER PUBLICATIONS

English Specification of 10-2011-0112086.
(Continued)

*Primary Examiner* — John Bedtelyon
(74) *Attorney, Agent, or Firm* — ANTONIO HA & U.S. PATENT, LLC

(57) ABSTRACT

A reflected light wavelength scanning device having a silicon photonics interrogator is provided. The device includes: a light source module for outputting broadband light; an optical sensor that receives light output from the light source module through a circulator, reflects light in a specific band to the circulator, and transmits light in a band other than the specific band; and an interrogator for selectively injecting the polarized light by separating the polarized light from the reflected light input through the circulator.

7 Claims, 9 Drawing Sheets

(56) References Cited

FOREIGN PATENT DOCUMENTS

KR         10-1908327     10/2018
KR   10-2021-0088366     7/2021

OTHER PUBLICATIONS

English Specification of 10-2015-0146468.
English Specification of 10-2021-0088366.
English Specification of 10-0807440.
English Specification of 10-1908327.

* cited by examiner

REFLECTED LIGHT WAVELENGTH SCANNING DEVICE INCLUDING SILICON PHOTONICS INTERROGATOR

CROSS-REFERENCE TO RELATED APPLICATION

This application claims priority to and the benefit of Korean Patent Application No. 10-2021-0026823, filed in the Korean Intellectual Property Office on Feb. 26, 2021, the entire contents of which are incorporated by reference herein.

BACKGROUND OF THE INVENTION

Field of the Disclosure

The present disclosure relates to a reflected light wavelength scanning device, particularly comprising a silicon photonics interrogator, which is capable of being miniaturized by having an optical fiber interrogator made of silicon.

Description of the Related Art

An optical fiber sensor measures change in light characteristics such as light intensity, phase, wavelength, and polarization state and converts the measurements to displacement, speed, temperature, humidity, strain, pressure, current, voltage. It is free from electromagnetic interference and is capable of acquiring measurements in high voltage or high current environments.

The optical fiber sensor has ability to obtain high-sensitivity, high-precision measurement, and remote measurement without any physical contact, to measure almost all physical quantities, and to perform low-light loss transmission up to a desired distance and photometric measurement without exposing light to the outside.

The optical fiber sensor changes the refractive index of the core by exposing ultraviolet rays to the core of a part of the optical fiber. The reflected wavelength is called a Bragg wavelength that determined by the effective refractive index in the core region and the spatial periodicity in which the refractive index changes. It can have different reflection wavelengths due to changes in the effective refractive index or factors that can affect periodicity (displacement, temperature, pressure, etc.), and a change in an external physical quantity can be measured by measuring the light reflected from the optical fiber sensor or by observing the transmitted spectrum.

A measurement technique using an optical element with wavelength selectivity, such as a fiber optic sensor, is generally used, and a system that measures the physical quantity by making the light output from the light source incident on an optical element having wavelength selectivity and measuring the reflected light having only a specific wavelength, is called interrogator.

The interrogator is used as a technique for diagnosing health of a building or measuring dispersion for multi-point measurement, and is used to measure various physical quantities such as temperature and strain.

The background referred to above is only for the purpose of improving the understanding of the present invention, and that should not be accepted as acknowledging as the common general knowledge to those of ordinary skill in the art.

PRIOR ART DOCUMENT

Patent Document

Korean Patent No. 10-2011-0112086
Korean Patent No. 10-2015-0146468

SUMMARY

The objective of the present invention is to provide a reflected light wavelength scanning device having a silicon photonics interrogator.

This invention may, however, be embodied in different forms and should not be construed as limited to the embodiments set forth herein. Rather, these embodiments are provided so that this disclosure will be thorough and complete, and will fully convey the scope of the invention to those skilled in the art.

The present disclosure provides a reflected light wavelength scanning device having a silicon photonics interrogator includes: a light source module for outputting broadband light; an optical sensor that receives light output from the light source module through a circulator, reflects light in a specific band to the circulator, and transmits light in a band other than the specific band; and an interrogator for selectively injecting the polarized light by separating the polarized light from the reflected light input through the circulator.

The present disclosure provides a reflected light wavelength scanning device, wherein the interrogator may be made of silicon.

The present disclosure provides a reflected light wavelength scanning device, wherein the interrogator may include: a polarization wave controller that separates polarized light from reflected light input through the circulator and transmits the polarized light; a front-end switching unit that selectively blocks or transmits the polarized light transmitted through the polarization wave controller; a high-resolution array waveguide grating for distributing the light passing through the front-end switching unit for each channel according to a wavelength band; a photodetector array comprising a plurality of photodetectors connected to each channel of the high-resolution arrayed waveguide grating; and a control unit.

The present disclosure provides a reflected light wavelength scanning device, wherein the polarization wave controller may include at least one of the followings, a polarization beam splitter (PBS) that splits polarized light into TE polarized light and TM polarized light by a difference in refractive index, or a Polarization Rotator.

The present disclosure provides a reflected light wavelength scanning device, wherein the polarization wave controller separates the polarized light into the TE polarized light and the TM polarized light through a Y-branch or X-branch method, wherein the front-end switching unit may include a first front-end switching unit that selectively transmits only the TE polarized light, and a second front-end switching unit that selectively transmits only the TM polarized light.

The present disclosure provides a reflected light wavelength scanning device, wherein the polarization wave controller may include a beam combiner that combines the TE polarized light and the TM polarized light when the TE polarized light and the TM polarized light pass through the front-end switching unit.

The present disclosure provides a reflected light wavelength scanning device, wherein the interrogator includes a back-end switching unit disposed between the high-resolution arrayed waveguide grating and the photodetector array, wherein the photodetector array corresponds to the number of channels of the back-end switching unit can be placed.

The present disclosure provides a reflected light wavelength scanning device further comprises a coupler disposed in at least one of the following sites, between the circulator and the polarization wave controller, between the back-end switching unit and the photodetector array, and between the polarization wave controller and the beam combiner.

In an aspect, there is provided a reflected light wavelength scanning device having a silicon photonics interrogator comprising, a light source module that outputs broadband light; an optical sensor that receives light output from the light source module through a circulator, reflects light in a specific band to the circulator, and transmits light in a band other than the specific band; a polarization wave controller that separates the polarized light from the reflected light input through the circulator and transmits the polarized light; a switching unit that selectively blocks or transmits the polarized light transmitted through the polarization wave controller; a high-resolution arrayed waveguide grating for distributing the light passing through the switching unit for each channel according to a wavelength band; a photodetector array comprising a plurality of photodetectors connected to each channel of the high-resolution arrayed waveguide grating; and a control unit.

Other detailed description and specific of the invention are followed as specification and drawings.

According to the present invention, a reflected light wavelength scanning device with the interrogator made of silicon allows to be miniaturized and also cost effective.

According to the present invention, a reflected light wavelength scanning device with the interrogator made of silicon allows accurately measure the light source incident from the photosensor.

According to the present invention, a reflected light wavelength scanning device with a polarization beam splitter (PBS) or a polarization rotator (Polarization Rotator) separates and incidents the polarized light into TE polarized light and TM polarized light, and ultimately measures the light source more accurately.

The effectiveness of the present invention is not limited to the mentioned above, and others not mentioned will be clearly understood by those skilled in the art from the following description.

DESCRIPTION OF EXEMPLARY EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

The specification describes in the embodiment for the present invention the term used in which relayed a number that is even endured. In the specification, a plurality type comprises a unit in a single may be phrase will not specially mentioned. Used in specification "(comprises) comprising" and/or "including (comprising)" at least one other handle components other components does not number the presence or addition times. The same drawing code which defines the same element throughout the specification, "and/or" ensures that all components and at least one each of a combination. Although "number 1", "number 2" is used to describe various components or the like, these components are not one number by these terms the concave disclosed. These terms have only one component used to discriminate between other components are disclosed. The, hereinafter referred to as number 1 in technical idea of the present invention components may be as well as in number 2 component are disclosed.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Hereinafter, embodiments disclosed in the present disclosure will be described in detail with reference to the accompanying drawings.

Figure 1:
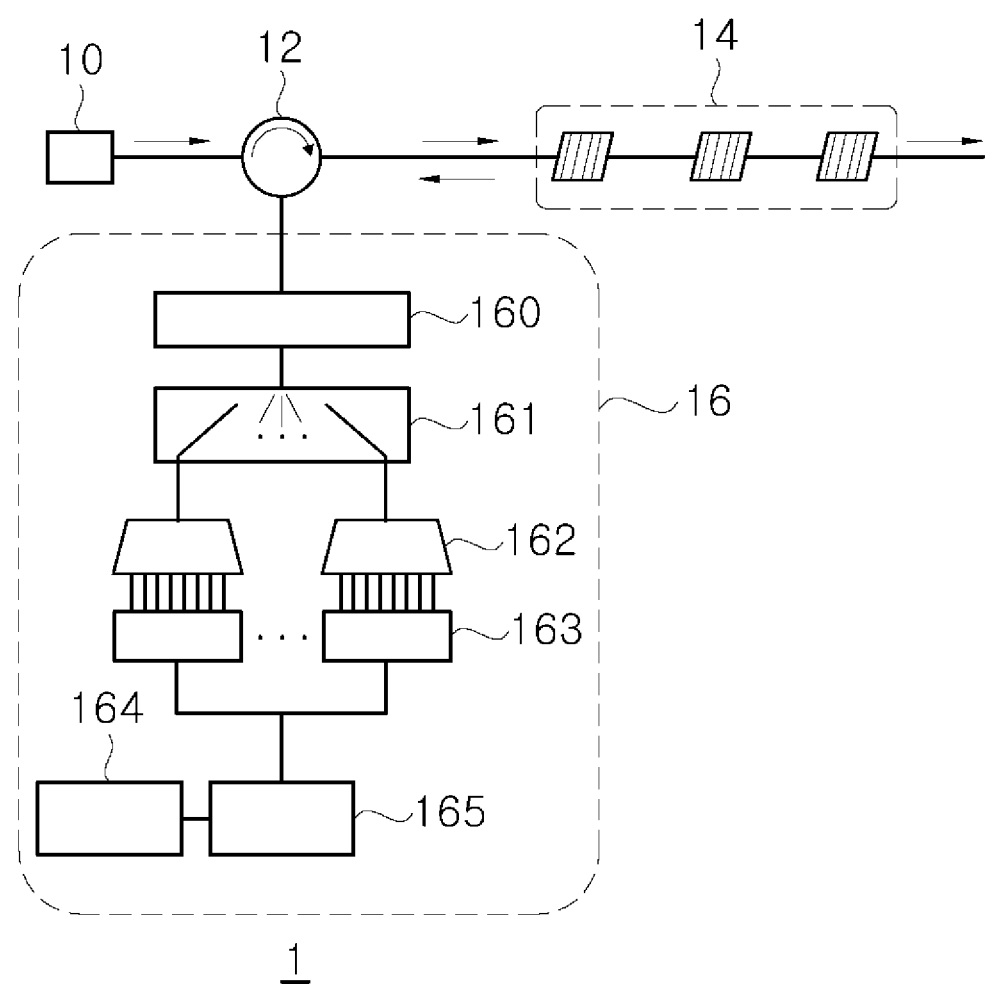
FIG. 1 is a view for explaining a reflected light wavelength scanning device having a silicon photonics interrogator according to an embodiment of the present disclosure.
Figure 2:
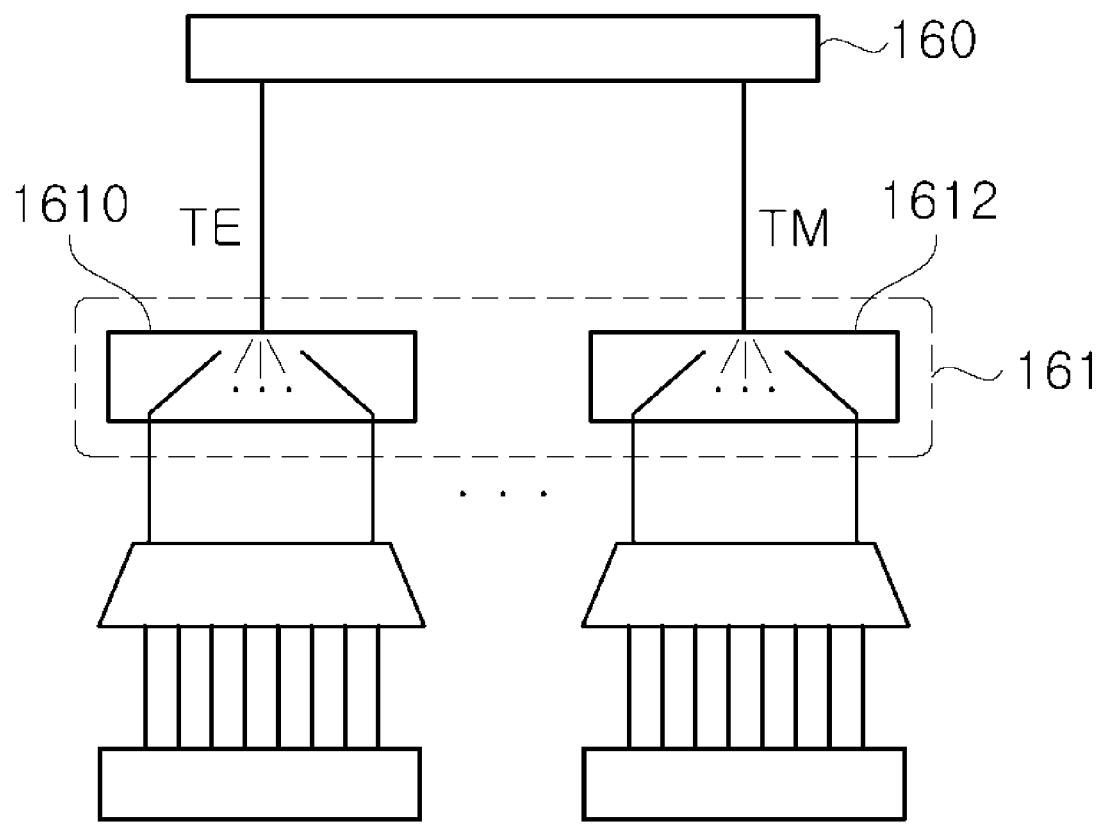
FIG. 2 is a view for explaining the front-end switching unit shown in FIG. 1.

FIG. 1 is a view for explaining a reflected light wavelength scanning device having a silicon photonics interrogator according to an embodiment of the present disclosure, and FIG. 2 is a diagram illustrating the front-end switching unit shown in FIG. 1 according to another embodiment of the present disclosure.

As shown in FIG. 1, the reflected light wavelength scanning device 1 having a silicon photonics interrogator according to the embodiment of the present disclosure may include a light source module 10, a circulator 12, an optical sensor 14 and an interrogator 16.

The light source module 10 may output a broadband light source to the circulator 12. In this case, as the light source, light of a specific wavelength is reflected through the optical sensor 14 of the optical cable, and the reflected light may be injected to the interrogator 16.

The light source module 10 is preferably a light source having a wide range of wavelengths and sufficient intensity to advance to the inside of the element under test so as to detect various defects existing in the film quality as well as the surface of the semiconductor element, or, ASE (Amplified spontaneous emission) light source having an optical fiber amplifier, a laser produced plasma light source, and a high-power light emitting diode, may be used, but are not limited thereto.

The circulator 12 is a passive non-reciprocal device having a circular structure that outputs a signal input to one terminal to an adjacent terminal, and may be disposed in a circular shape.

The circulator 12 receives the light output from the light source module 10 using an optical cable, outputs the inputted light to the optical sensor 14, and transmits the light reflected from the optical sensor 14 using an optical cable, and the inputted light may be output to the interrogator 16 through an optical cable.

The optical sensor 14 may reflect light corresponding to a specific band among light sources input through the optical cable to the circulator 12 and transmit light corresponding to the remaining bands except for the specific band.

In the present embodiment, the photosensor 14 may be a reflective filter of a Fiber Bragg grating (FBG) structure, but is not limited thereto. In this case, the FBG is provided such that the refractive index of the optical fiber core is periodically changed in μm units along the optical fiber axis, and only transmits or reflects light of a specific wavelength among optical signals of various wavelengths passing through the optical fiber. Since the FBG has a property of reflecting or transmitting light of a selected wavelength according to a change in tensile force or temperature applied to the optical fiber, the optical sensor 14 controls physical quantities such as temperature applied to the optical fiber when adjusting the reflection and transmission bands. By changing the length of the optical fiber, that is, the length corresponding to the refractive index change period, the band of transmitted or reflected light can be adjusted.

The interrogator 16 may include a polarization wave controller 160, a front-end switching unit 161, a high-resolution array waveguide grating 162, a photodetector array 163, a display unit 164, and a control unit 165.

In this embodiment, the interrogator 16 is preferably made of silicon. Since the interrogator 16 is made of a silicon material, it is possible to miniaturize the process by minimizing the process, thereby obtaining the effect of reducing the cost. That is, the interrogator 16 made of silicon can pass only polarized waves in a wide band.

According to an embodiment, the polarization wave controller 160, the front-end switching unit 161, and the high-resolution arrayed waveguide grating 162, or the polarization wave controller 160, the front-end switching unit 161, the high-resolution arrayed waveguide grating 162 and the photodetector array 163 only may be made of silicon, but is not limited thereto.

The polarization wave controller 160 may divide the light into a polarized wave that is easily transmitted among the light incident through the optical cable, and may stably inject the polarized wave into the interrogator 16.

The polarization wave controller 160 may include a polarization beam splitter (PBS).

The polarization wave controller 160 is a polarization splitter that separates polarized waves, and may separate polarized light into TE polarized light and TM polarized light due to a difference in refractive index.

For example, the polarization wave controller 160 may split the polarized light into TE polarized light and TM polarized light through Y-branching or X-branching, but is not limited thereto.

In some embodiments, the polarization wave controller 160 may include a polarization rotator. That is, the polarization rotator can separate polarized light into TE polarized light and TM polarized light by the difference in refractive index.

According to an embodiment, the polarization wave controller 160 may include a converter (not shown) that converts TM polarized light among polarized waves into TE polarized light.

The front-end switching unit 161 may transmit TE polarized light and TM polarized light separated from the polarized wave beam splitter.

Alternatively, the front-end switching unit 161 may selectively block or transmit TE polarized light and TM polarized light separated from the polarized wave beam splitter.

For example, the front-end switching unit 161 may transmit TE polarized light and block TM polarized light.

In this embodiment, the front-end switching unit 161 may be composed of 12 channels, but is not limited thereto, and may be composed of N channels.

For example, as shown in FIG. 2, the front-end switching unit 161 includes a first front-end switching unit 1610 and a second front-end switching unit 1612 that can selectively block or transmit TE polarized light and TM polarized light. may include The first front-end switching unit 1610 may transmit TE polarized light and block TM polarized light.

According to an embodiment, the first front-end switching unit 1610 may transmit TM polarized light and block TE polarized light.

The second front-end switching unit 1612 may transmit TM polarized light and block TE polarized light.

According to an embodiment, the second front-end switching unit 1612 may transmit TE polarized light and block TM polarized light.

The high-resolution arrayed waveguide grating 162 may distribute the TE polarized light and the TM polarized light output from the front-end switching unit 161 for each channel.

For example, the high-resolution arrayed waveguide grating 162 may be configured as a flat-top arrayed waveguide grating that receives an optical signal in a wavelength range of 1520 nm to 1570 nm. That is, the high-resolution arrayed waveguide grating 162 is for scanning the wavelength and power of the optical signal in the entire C-band band, and is a flat-top (high-resolution) arrayed waveguide that can maintain a 3 dB bandwidth at a constant value while significantly reducing the optical loss value.

Accordingly, the high-resolution arrayed waveguide grating 162 has a flat top of the waveform of each channel, and thus has a constant output value even if the wavelength of the output spectrum changes according to a change in temperature.

In the present embodiment, the high-resolution arrayed waveguide grating 162 has a bandwidth (3 dB bandwidth) of each channel of about 0.28 nm, and 96 channels with an inter-channel spacing of 0.4 nm±0.015 nm may be configured, but not limited thereto.

In this case, the flat-top arrayed waveguide grating is for obtaining a uniform output value irrespective of the influence of temperature from an arrayed waveguide grating having an output spectrum that is sensitive to temperature. According to the spectral response, the arrayed waveguide grating can be classified into a Gaussian type and a flat-top type. In this case, the Gaussian type may have a Gaussian distribution in light output characteristics according to wavelength, and the flat-top type may have a uniform distribution in which the maximum light output is in a specific wavelength range.

The high-resolution arrayed waveguide grating 162 uses silicon to design a waveguide mask and implement a waveguide in order to accurately and efficiently measure the wavelength and power of an optical signal having an adjacent frequency range in the C band. It can be manufactured through a deposition process, and for example, it can be manufactured to have an insertion loss of −3.5 dB or less and a polarization-dependent loss of 0.5 dB or less.

The photodetector array 163 may include a plurality of photodetectors connected to each channel of the high-resolution array waveguide grating 162 to convert a signal received through each channel into an electrical signal.

The display unit 164 may visually display a signal output from the photodetector array 163.

For example, the display unit 164 may visually output an output signal according to the wavelength of the received optical signal on the screen using symbols, letters, numbers, or graphs.

Alternatively, the display unit 164 may audibly output a signal using a speaker that outputs audio, or the like.

The display unit 164 includes a display panel and an interface such as LCD and LED, and may be connected to an input unit capable of inputting a setting by a user. The display unit 164 may be implemented in the form of a touch panel and may be configured integrally with the input unit.

The control unit 165 receives the electrical signal converted from the photodetector array 163, derives the power of each channel of the high-resolution array waveguide grating 162, and transmits the derived power to the display unit 164 as an output signal. have. That is, the control unit 165 may analyze the signal received from the photodetector array 163 and transmit an output signal according to the wavelength of the optical signal to the display unit 164.

The control unit 165 subdivides each channel into two or more and includes a data collection module that matches the optical signal detected by the photodetector array 163 with the frequency of each subdivided channel, and includes a CPU or the like for data processing. It may further include a microprocessor. The data acquisition module may include an analog to digital converter (ADC) that converts an analog signal into a digital signal and a data acquisition (DAQ). The data collection module digitizes the output from each channel of the high-resolution arrayed waveguide grating 162, and uses a microprocessor and software provided in the control unit 165 to be greater than 0.4 nm, which is the channel interval of the high-resolution arrayed waveguide grating 162. Since the output spectrum according to the wavelength of each optical signal can be further subdivided and obtained through the process of calculating the measured value for every small 0.1 nm, high-resolution wavelength power scanning may be possible. According to an embodiment, the output spectrum according to the wavelength of each optical signal can be further subdivided and obtained through the process of calculating the measured value for every 0.01 nm smaller than 0.4 nm, which is the channel interval of the high-resolution arrayed waveguide grating 162, so that the high-resolution Wavelength power scanning of may be possible.

According to an embodiment, the interrogator 16 may be disposed on a printed circuit board (PCB) substrate provided with electrical wiring. That is, by disposing the interrogator 16 on the PCB substrate provided with the electrical wiring, damage and damage that may occur due to thermal energy can be prevented. Accordingly, reliability may be improved by more accurately measuring the stably incident light source.

Such a reflected light wavelength scanning device 1 is transmitted from the light source module 10 to the optical sensor 14 through the circulator 12 due to deformation (eg, distance change, bending), temperature, etc. of each sensor connected in series. The reflected wavelength of the light is changed, and the polarized light incident on the interrogator 16 made of silicon is separated into TM polarized light and TE polarized light and is incident on each, so that the change in the peak wavelength proportional to the strain is sensed, It is possible to easily grasp the state of the communication network line.

Figure 3:
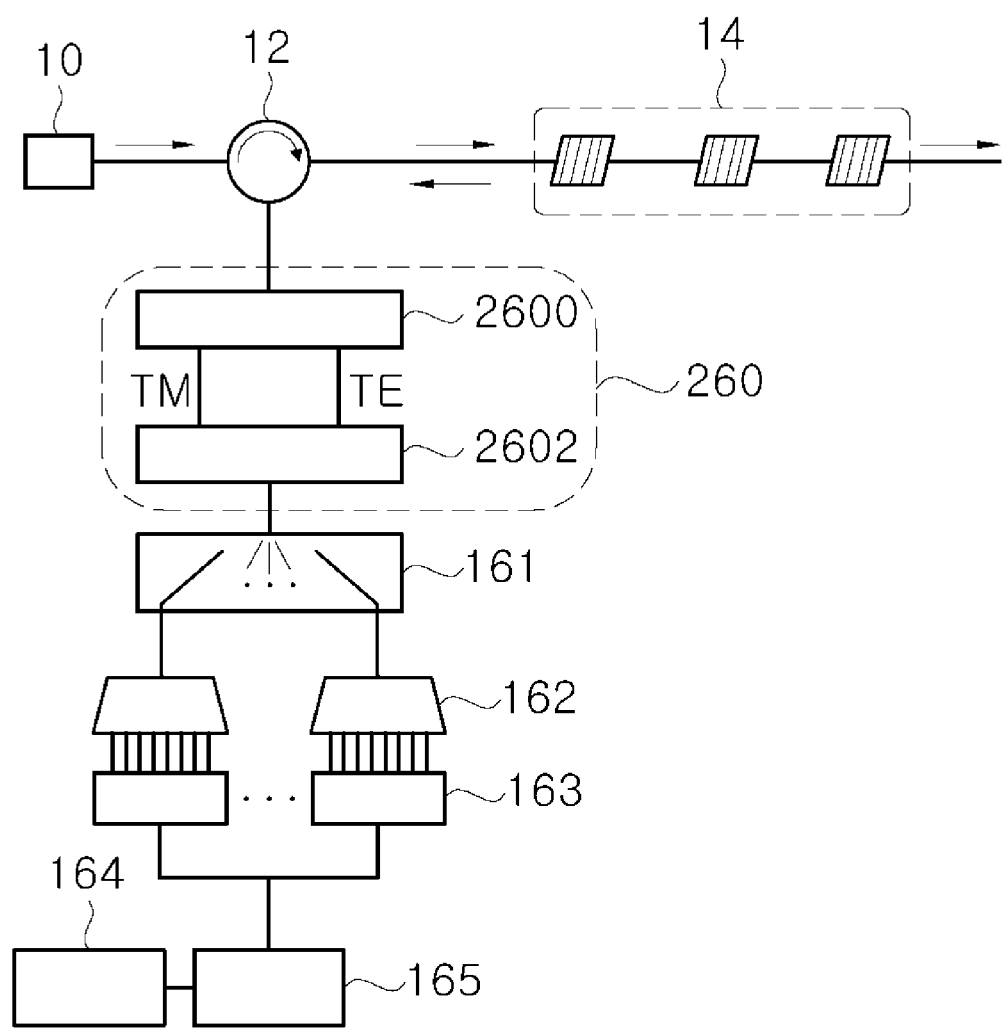
FIG. 3 is a view for explaining a reflected light wavelength scanning device having a silicon photonics interrogator according to another embodiment of the present disclosure.

FIG. 3 is a view for explaining a reflected light wavelength scanning device having a silicon photonics interrogator according to another embodiment of the present disclosure.

Referring to FIG. 3, the reflected light wavelength scanning device 2 having a silicon photonics interrogator according to another embodiment of the present invention may include a polarization wave controller 260.

Except for the polarization wave controller 260 shown in FIG. 3, the reflected light wavelength scanning device 1 having the silicon photonics interrogator shown in FIG. 1 may have the same characteristics.

In the following FIG. 3, a detailed description of the content overlapping with the content described in FIG. 1 will be omitted, and different points may be mainly described. Accordingly, components that perform the same function as the reflected light wavelength scanning device 2 having the silicon photonics interrogator shown in FIG. 3 are given the same reference numerals as in FIG. 1, and detailed description thereof will be omitted.

The polarization wave controller 260 may include a polarization wave beam splitter 2600 and a beam combiner 2602.

The polarized wave beam splitter 2600 is a polarization splitter that separates polarized waves, and may split polarized light into TE polarized light and TM polarized light due to a difference in refractive index.

For example, the polarized wave beam splitter 2600 may split the polarized light into TE polarized light and TM polarized light through a Y-branch or X-branch method, but is not limited thereto.

The beam combiner 2602 may receive the separated TE polarized light and TM polarized light and combine them into one light. That is, it is possible to generate stable light by combining input polarized light.

The reflected light wavelength scanning device 2 is transmitted from the light source module 10 to the optical sensor 14 through the circulator 12 due to deformation (eg, distance change, bending), temperature, etc. of each sensor connected in series. The reflected wavelength of the light is changed, and after separating the polarized light incident on the interrogator 16 made of silicon into TM polarized light and TE polarized light, the separated TM polarized light and TE polarized light are combined into one light source, so that a stable light source is incident, thus, it is possible to more easily understand the state of the reflected communication network line.

Figure 4:
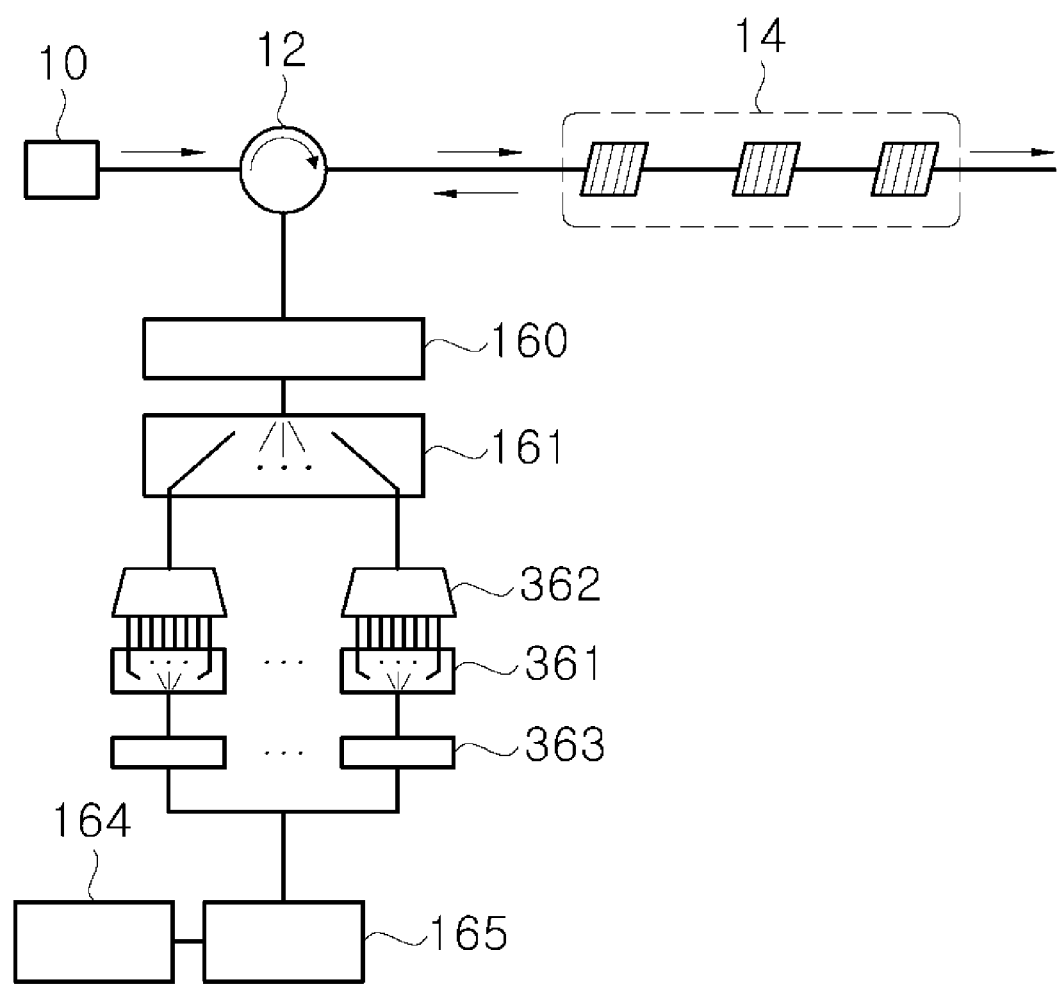
FIG. 4 is a view for explaining a reflected light wavelength scanning device having a silicon photonics interrogator according to another embodiment of the present disclosure.
Figure 5:
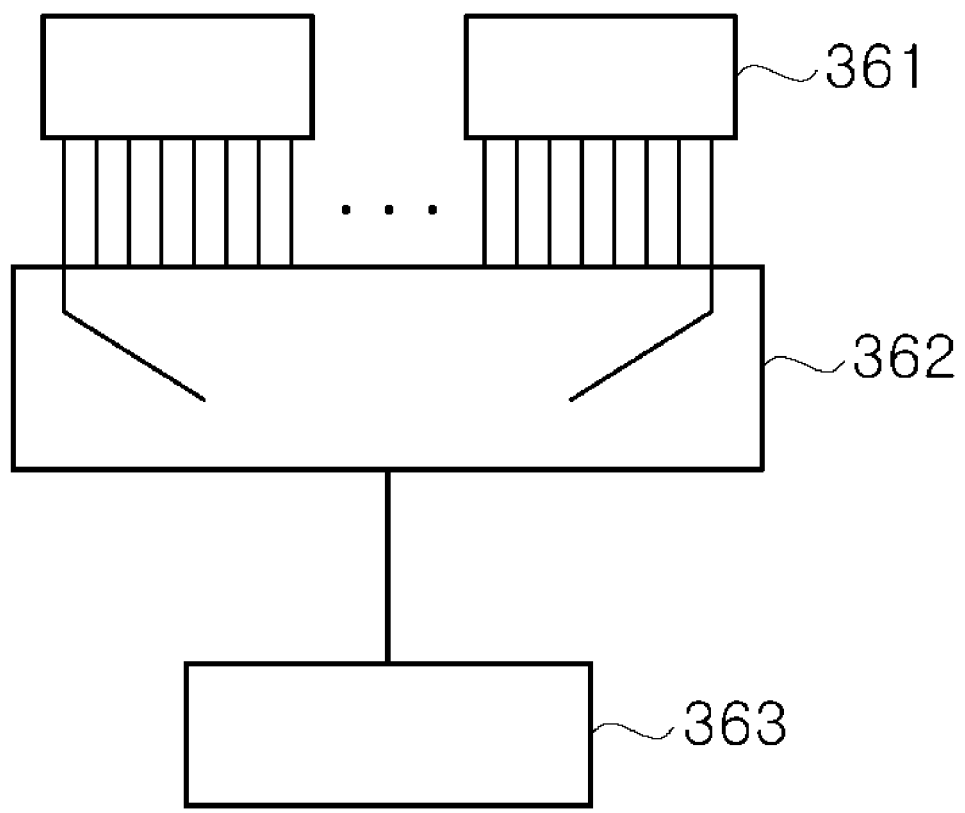
FIG. 5 is a view for explaining the rear-stage switching unit shown in FIG. 4.

FIG. 4 is a view for explaining a reflected light wavelength scanning device having a silicon photonics interrogator according to another embodiment of the present invention, and FIG. 5 is a view for explaining the back-end switching unit shown in FIG. 4.

Referring to FIG. 4, the reflected light wavelength scanning device 3 having a silicon photonics interrogator according to another embodiment of the present invention may include a back-end switching unit 361.

Except for the back-end switching unit 361 shown in FIG. 4, it may have the same characteristics as the reflected light wavelength scanning device 1 having the silicon photonics interrogator shown in FIG. 1.

In the following FIG. 4, detailed descriptions of contents overlapping with those described in FIG. 1 will be omitted, and different points may be mainly described. Accordingly, components that perform the same function as the reflected light wavelength scanning device 3 having the silicon photonics interrogator shown in FIG. 4 are given the same reference numerals as in FIG. 1, and detailed description thereof will be omitted.

A plurality of back-end switching units 361 may be disposed between the high-resolution arrayed waveguide grating 362 and the photodetector array 363.

The back-end switching unit 361 may transmit a signal passing through the high-resolution arrayed waveguide grating 362 in correspondence with each channel of the high-resolution arrayed waveguide grating 362.

Alternatively, the back-end switching unit 361 may selectively block or transmit a signal passing through the high-resolution arrayed waveguide grating 362.

In the present embodiment, the back-end switching units 361 may be configured in 12 pieces corresponding to the channels of the high-resolution arrayed waveguide grating 362. In this case, when the back-end switching unit 361 is configured with 12 pieces having 8 channels, the photodetector array 363 may be formed with 12 pieces corresponding to the back-end switching unit 361.

Alternatively, the back-end switching unit 361 may be composed of N channels.

For example, as shown in FIG. 5, the back-end switching unit 361 may be composed of one piece that receives all of the light incident from the channel of the high-resolution array waveguide grating 362. In this case, when the back-end switching unit 361 is configured as one piece of 96 channels, the photodetector array 163 may be formed as one piece corresponding to the rear-stage switching unit 361.

Such a reflected light wavelength scanning device 3 is transmitted from the light source module 10 to the optical sensor 14 through the circulator 12 due to deformation (eg, distance change, bending), temperature, etc. of each sensor connected in series. The reflected wavelength of the light is changed, and the polarized light incident on the interrogator 16 made of silicon is separated into TM polarized light and TE polarized light and then selectively transmitted or blocked when the separated TM polarized light and TE polarized light are incident. It is possible to more easily grasp the state of the communication network line reflected by the light source.

Figure 6:
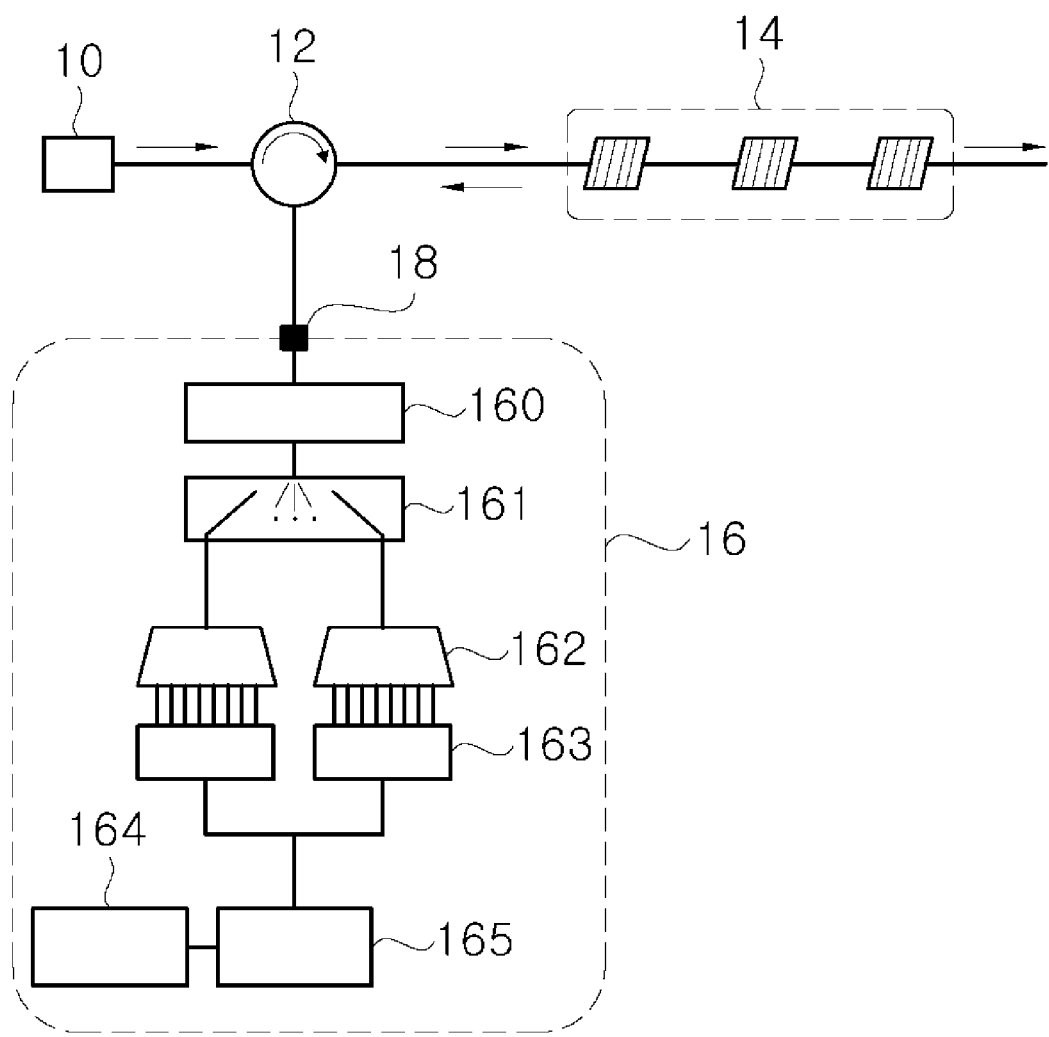
FIG. 6 is a view for explaining a reflected light wavelength scanning device having a silicon photonics interrogator according to another embodiment of the present disclosure.
Figure 7:
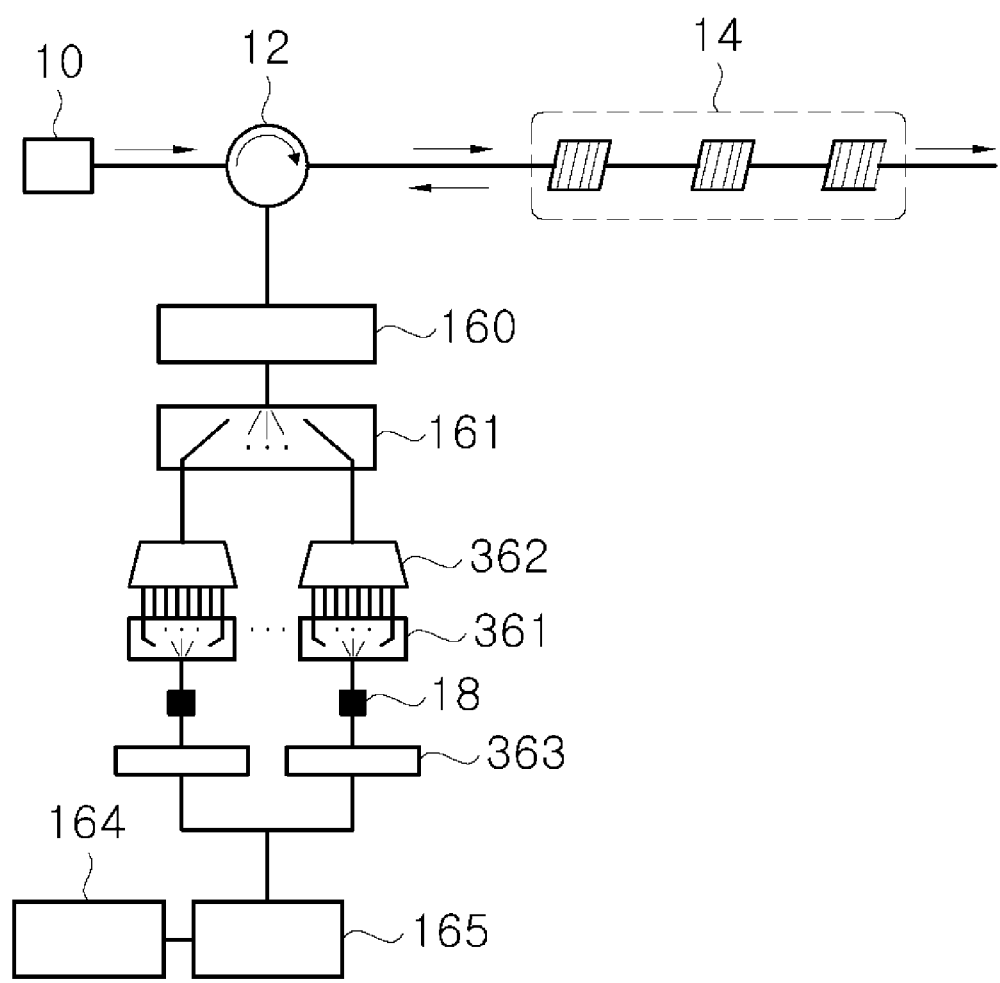
FIGS. 7, 8, and 9 are views for explaining the coupler shown in FIG. 6.
Figure 8:
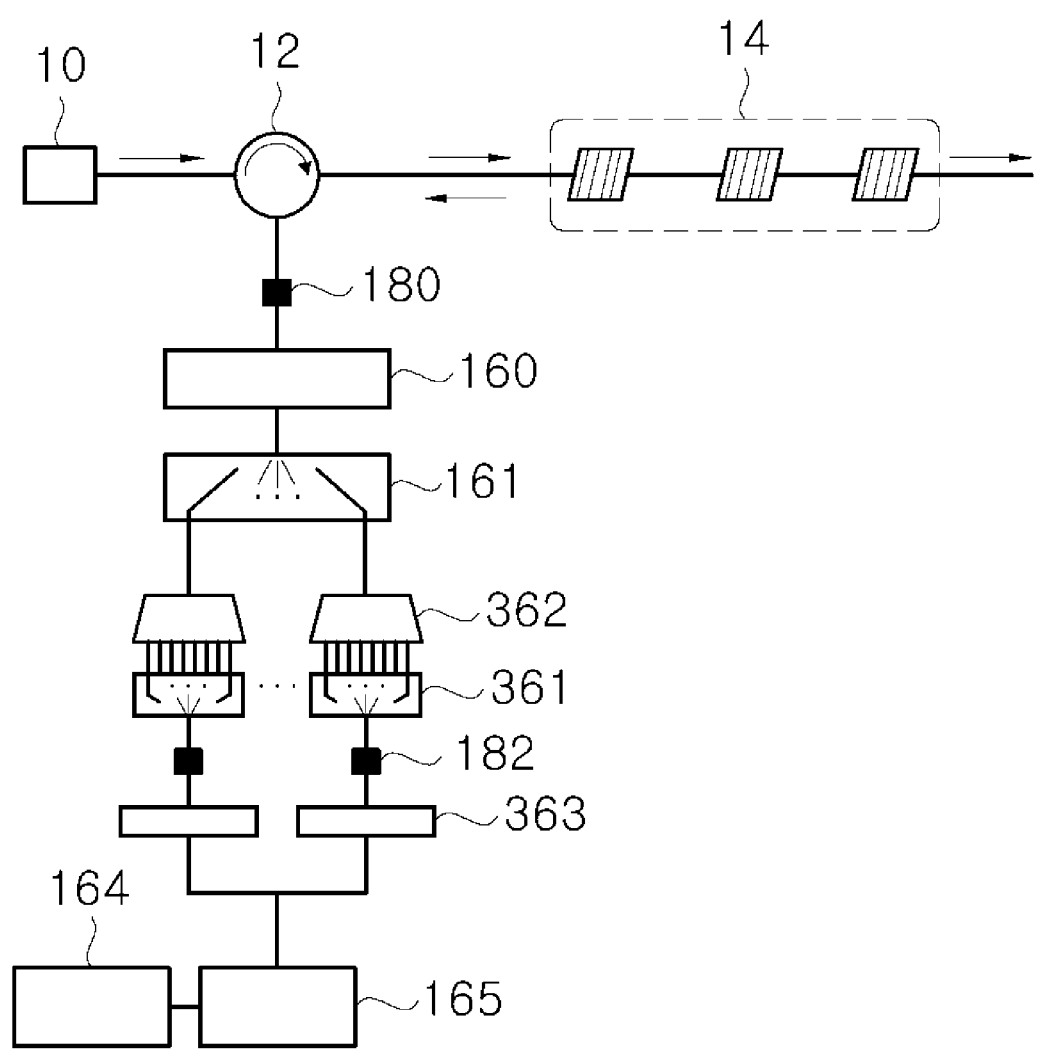
Figure 9:
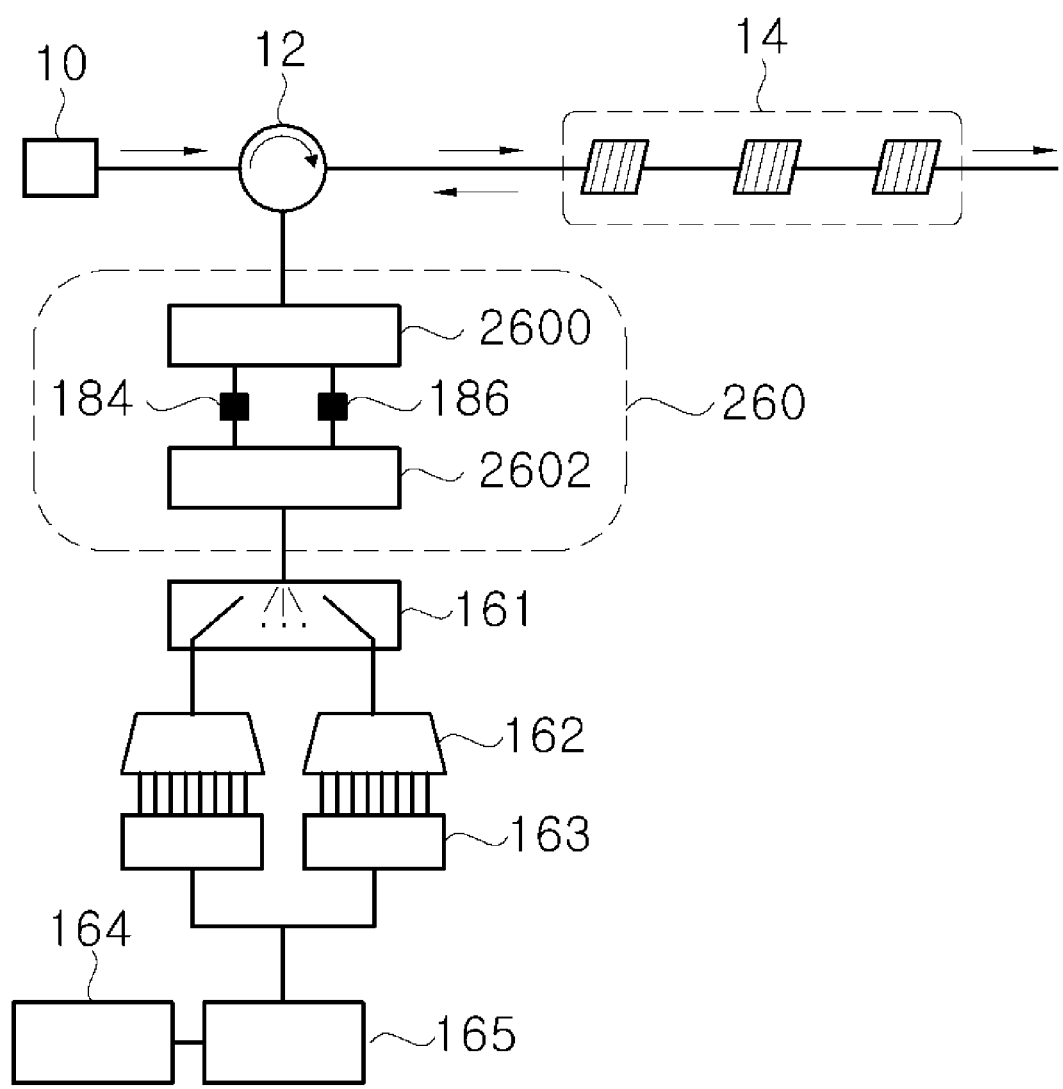

FIG. 6 is a view for explaining a reflected light wavelength scanning device having a silicon photonics interrogator according to another embodiment of the present invention, and FIGS. 7 to 9 are views for explaining the coupler shown in FIG. 6.

Referring to FIG. 6, a reflected light wavelength scanning device 4 having a silicon photonics interrogator according to another embodiment of the present invention may include a coupler 18.

Except for the coupler 18 shown in FIG. 6, it may have the same characteristics as the reflected light wavelength scanning device 1 having the silicon photonics interrogator shown in FIG. 1.

In the following FIG. 6, detailed description of the content overlapping with the content described in FIG. 1 will be omitted, and different points may be mainly described. Accordingly, components that perform the same function as the reflected light wavelength scanning device 4 having the silicon photonics interrogator shown in FIG. 6 are given the same reference numerals as in FIG. 1, and detailed description thereof will be omitted.

The coupler 18 may be a connecting element disposed and connected between the circulator 12 and the interrogator 16. That is, the coupler 18 may be disposed between the circulator 12 and the polarization wave controller 160 so that the reflected light source is rapidly incident.

The coupler 18 splits the reflected light source and combines it to make it enter the interrogator 16, thereby minimizing optical interference.

According to an embodiment, the coupler 18 may be disposed between the back-end switching unit 361 and the photodetector array 363 as shown in FIG. 7.

According to an embodiment, the coupler 18 includes a front-end coupler 180 disposed between the circulator 12 and the polarization wave controller 160 and a back-end coupler 182 disposed between a back-end switching unit 361 and a photodetector array 363 as shown in FIG. 8.

The front-end coupler 180 may control so that a signal among the reflected optical signals is not simultaneously incident on the interrogator 16.

Specifically, the front-end coupler 180 receives two or more similar wavelength band optical signals, so it is difficult to accurately determine the output and wavelength of the optical signal in any one channel of the high-resolution array waveguide grating 162 according to the present embodiment. In order to solve the problem, it is possible to prevent the respective optical signals from being input at the same time.

For example, the front-end coupler 180 may receive the optical signal closest to the center wavelength of each channel among the center wavelengths of each of the two or more optical signals as it is, and may cause the remaining optical signals to be input with a time delay.

The back-end coupler 182 may control so that the optical signal passing through the back-end switching unit 361 to the photodetector array 363 is not simultaneously incident on the high-resolution arrayed waveguide grating 362.

Specifically, the rear-end coupler 182 receives two or more similar wavelength band optical signals, so that it is difficult to accurately determine the output and wavelength of the optical signal in any one channel of the high-resolution arrayed waveguide grating 162 according to the present embodiment. In order to solve the problem, it is possible to prevent each optical signal from being input at the same time.

For example, the back-end coupler 182 may receive the optical signal closest to the center wavelength of each channel among the center wavelengths of each of the two or more optical signals as it is, and may cause the remaining optical signals to be input with a time delay.

Depending on the embodiment, the coupler 18 may be disposed between the polarizing wave beam splitter 2600 and the beam combiner 2602 as shown in FIG. 9. That is, the coupler 18 may include a TE coupler 184 to which the separated TE polarized light is incident and a TM coupler 186 to which the separated TM polarized light is incident.

The TE coupler 184 may control the TE polarization so that only the TE polarization is incident by filtering the TM polarization. That is, the TE coupler 184 filters the TM polarized light to enable accurate wavelength and power (output) measurements for each signal.

The TM coupler 186 may control the TM polarization so that only the TM polarization is incident by filtering the TE polarization. That is, the TM coupler 186 filters the TE polarization so that the exact wavelength and power (output) for each signal can be measured.

Such a reflected light wavelength scanning device 4 filters the optical signals flowing from the circulator 12 into the high-resolution array waveguide grating 162 to have the same wavelength or a similar wavelength that is difficult to detect by the control unit 165, and filters it to each signal. It is possible to measure the exact wavelength and power of the output.

The steps of a method or algorithm described in connection with the embodiments of the present disclosure may be implemented directly in hardware, implemented as a software module executed by hardware, or a combination thereof. Software may also reside on random access memory (RAM), read only memory (ROM), erasable programmable ROM (EPROM), electrically erasable programmable ROM (EEPROM), flash memory, hard disk, removable disk, CD-ROM, or any type of computer-readable recording medium well known in the art to which the present disclosure pertains.

In the above, embodiments of the present disclosure have been described with reference to the accompanying drawings, but those of ordinary skill in the art to which the present invention pertains will be able to understand that the present invention can be implemented in other specific forms without changing the technical spirit or essential features thereof. Therefore, the embodiments described above are illustrative in all respects and should be understood as non-limiting.

What is claimed is:

1. A reflected light wavelength scanning device with silicon photonics interrogator comprising:
    a light source module that outputs broadband light;
    an optical sensor that receives light output from the light source module through a circulator, reflects light in a specific band to the circulator, and transmits light in a band other than the specific band; and
    an interrogator for selectively injecting polarized light by separating polarized light from the reflected light input through the circulator,
    wherein the interrogator comprising: a polarization wave controller that separates the polarized light from the reflected light input through the circulator and transmits the polarized light; a front-end switching unit that selectively blocks or transmits the polarized light transmitted through the polarization wave controller; a high-resolution arrayed waveguide grating for distributing the light transmitted through the front-end switching unit to each channel according to a wavelength band; a photodetector array comprising a plurality of photodetectors connected to each channel of the high-resolution arrayed waveguide grating; and a control unit.

2. The reflected light wavelength scanning device of claim 1,
    wherein the interrogator comprising a silicon photonics interrogator made of silicon.

3. The reflected light wavelength scanning device of claim 1,
    wherein the polarization wave controller comprising at least one of the followings:
    polarization Beam Splitter (PBS) that splits polarized light into TE polarized light and TM polarized light by the difference in refractive index, or Polarization Rotator.

4. The reflected light wavelength scanning device of claim 3,
    wherein the polarization wave controller splitting the polarized light into the TE polarized light and the TM polarized light through Y-branching or X-branching, and
    wherein the front-end switching unit comprising a first front-end switching unit selectively transmitting only the TE polarized light and a second front-end switching unit selectively transmitting only the TM polarized light.

5. The reflected light wavelength scanning device of claim 3,
    wherein the polarization wave controller comprising a beam combiner that combines the TE polarized light and the TM polarized light when the TE polarized light and the TM polarized light pass through the front-end switching unit.

6. The reflected light wavelength scanning device of claim 5,
    wherein the interrogator comprising a back-end switching unit disposed between the high-resolution arrayed waveguide grating and the photodetector array, wherein the photodetector array is disposed corresponding to the number of channels of the back-end switching unit.

7. The reflected light wavelength scanning device of claim 6, further comprising a coupler disposed between at least one of the circulators and the polarization wave controller, between the back-end switching unit and the photodetector array, and between the polarization wave controller and the beam combiner.

* * * * *